United States Patent
Hipshier et al.

(10) Patent No.: US 8,505,997 B2
(45) Date of Patent: Aug. 13, 2013

(54) INTEGRATED SOFT CENTER FLOOR CONSOLE

(75) Inventors: Jason M. Hipshier, Hudsonville, MI (US); David J. McCarthy, Holland, MI (US); Scott W. Kaufmann, Clio, MI (US); Gregory N. Brncick, Holland, MI (US); Brian R. Dexter, Grand Haven, MI (US)

(73) Assignee: Johnson Controls Technology Company, Holland, MI (US)

( * ) Notice: Subject to any disclaimer, the term of this patent is extended or adjusted under 35 U.S.C. 154(b) by 85 days.

(21) Appl. No.: 12/521,614

(22) PCT Filed: Jan. 3, 2008

(86) PCT No.: PCT/US2008/050102
§ 371 (c)(1),
(2), (4) Date: Aug. 26, 2009

(87) PCT Pub. No.: WO2008/086089
PCT Pub. Date: Jul. 17, 2008

(65) Prior Publication Data
US 2010/0066115 A1    Mar. 18, 2010

Related U.S. Application Data

(60) Provisional application No. 60/878,618, filed on Jan. 4, 2007.

(51) Int. Cl.
*B60R 7/00*    (2006.01)
*B68G 7/00*    (2006.01)

(52) U.S. Cl.
USPC ............................................ 296/37.8; 29/91.1

(58) Field of Classification Search
USPC ........... 296/37.8, 153, 70, 1.07, 1.09, 190.01, 296/37.13, 37.12, 24.34; 297/284.1
See application file for complete search history.

(56) References Cited

U.S. PATENT DOCUMENTS 2,797,739 A * 7/1957 Orsini ...................... 297/188.17
2,942,649 A * 6/1960 Wells ............................ 297/125

(Continued)

FOREIGN PATENT DOCUMENTS

| DE | 39 17 961 C1 | 12/1990 |
| JP | S62-008141 U | 1/1987 |
| JP | 2004-529806 A | 9/2004 |
| WO | WO-02/087924 A1 | 11/2002 |

OTHER PUBLICATIONS

International Search Report dated Apr. 18, 2008 for corresponding PCT Application No. PCT/US2008/050102 (2 pgs.).

(Continued)

*Primary Examiner* — Glenn Dayoan
*Assistant Examiner* — Sunsurraye Westbrook
(74) *Attorney, Agent, or Firm* — Foley & Lardner LLP

(57) ABSTRACT

A center console (20) includes a first panel (32) having a first upper surface (76) and a first padded portion (28). The first padded portion (28) includes a first outer cover (54). The first outer cover (54) is mounted to the first panel (32) such that a first cavity (56) is formed by at least a portion of the outer cover (54) and at least a portion of the upper surface (76). The first padded portion (28) also includes first padding (56) located, in the first cavity (56).

26 Claims, 3 Drawing Sheets

(56) References Cited

U.S. PATENT DOCUMENTS

| | | | | |
|---|---|---|---|---|
| 3,951,448 | A | * | 4/1976 | Hawie ............................ 297/113 |
| 5,275,779 | A | * | 1/1994 | Marfilius et al. .............. 264/46.6 |
| 5,752,740 | A | * | 5/1998 | Volkmann et al. ........ 297/188.19 |
| 5,788,324 | A | * | 8/1998 | Shea et al. ..................... 297/113 |
| 2003/0155786 | A1 | * | 8/2003 | Kim et al. ..................... 296/24.1 |
| 2004/0080173 | A1 | * | 4/2004 | Niwa et al. ................. 296/24.34 |
| 2006/0066118 | A1 | * | 3/2006 | Radu et al. .................... 296/37.8 |
| 2006/0154028 | A1 | * | 7/2006 | Dooley et al. ................. 428/138 |
| 2007/0148411 | A1 | * | 6/2007 | Yamada ......................... 428/172 |
| 2009/0179451 | A1 | * | 7/2009 | Penner et al. ................... 296/70 |

OTHER PUBLICATIONS

PCT International Preliminary Report on Patentability corresponding to PCT/US2008/050102, dated Jul. 7, 2009, 1 page.

PCT Written Opinion corresponding to PCT/US2008/050102, dated Jul. 7, 2009, 5 pages.

Notice of Reasons for Rejection in Japanese Patent Application No. 2009-544969 dated May 29, 2012.

Mexican Office Action dated Nov. 18, 2011 as received in corresponding Mexican Application No. MX/a/2009/007176, 4 pages.

* cited by examiner

INTEGRATED SOFT CENTER FLOOR CONSOLE

CROSS REFERENCE TO RELATED APPLICATIONS

The present application is a national stage application of PCT/US2008/050102, filed Jan. 3, 2008, which claims priority to and the benefit of U.S. Provisional Application No. 60/878,618, filed Jan. 4, 2007. The foregoing applications are incorporated by reference herein in their entirety.

FIELD

The subject of the disclosure relates generally to the field of vehicular components and methods of making such components. More specifically, the subject of the disclosure relates to a center console with a storage compartment and a padded armrest configured to accommodate individuals of various sizes. The subject of the disclosure further relates to a method for making the center console.

BACKGROUND

Vehicles such as automobiles, trucks, airplanes, boats, etc. often include a number of various components which are configured to assist in vehicular operation and/or driver/passenger comfort. Components such as seats, seat belts, steering wheels, and mirrors are generally adjustable to accommodate drivers and passengers of varying heights, weights, arm lengths, leg lengths, etc. A center console is a vehicular component positioned between the front seats of an automobile, and may include an armrest, a storage compartment, one or more beverage holders, a cigarette lighter, etc.

Traditional center consoles are generally statically mounted to the frame of a vehicle. As a result, traditional center consoles are limited by their inability to provide a comfortable arm rest for drivers and passengers of varying sizes. Center consoles which are adjustably mounted to the frame of the vehicle are often secured to the frame with a bulky, complex mounting mechanism such as a 4-bar linkage. These mounting mechanisms add additional weight and complexity to the vehicle, and occupy a significant amount of volume which could otherwise be utilized for storage or other center console accessories.

Traditional center consoles often have a storage compartment that is accessible by opening a lid that is pivotally mounted to the top of the center console. The lid may be pivotally mounted through the use of a hinge or other pivot mechanism. An upper surface of the lid generally includes a padded surface which is configured to act as an armrest for the driver and/or the passenger. The lid may also include a latch, button, or other release which secures the lid to the top of the center console. To access the storage compartment, the top of the lid must be free from obstructions such that the lid can be pivotally raised. As such, a driver or passenger is forced to inconveniently remove his/her arm from the armrest on the lid prior to accessing the storage compartment. In addition, traditional pivotally mounted lids are generally bulky, occupying significant volume that could otherwise be utilized for the storage compartment.

Center consoles, dashboards, door panels, steering wheels, and other vehicle components which are likely to come into physical contact with a driver or passenger often include a padded portion configured to add comfort to the interior of the vehicle. The padded portion generally includes a rigid substrate, a soft and flexible outer surface (or skin), and padding positioned between the rigid substrate and the outer surface. Once the padded portion is assembled, the padded portion is mounted to a door panel, center console lid, dashboard, or other rigid surface. The padded portion is generally mounted by securing the rigid substrate of the padded portion to the rigid surface using fasteners, adhesives, or other mounting methods. Unfortunately, the use of a rigid substrate in traditional padded portions adds additional weight and cost (i.e., labor and parts) to the vehicle. The use of fasteners to mount the rigid substrate to the vehicle further adds weight and cost to the vehicle.

Thus, the inventors have perceived a need for a center console that is able to provide a comfortable, convenient arm rest for drivers and passengers of various sizes without utilizing a bulky or complex adjustment assembly. The inventors have also perceived a need for a center console with an armrest and a storage compartment that is accessible without disrupting an individual using the armrest. The inventors have further perceived a need for making a lightweight, low cost padded portion which can be positioned on virtually any rigid surface in the interior of a vehicle.

SUMMARY

An exemplary center console is provided. The center console includes a first panel having a first upper surface and a first padded portion. The first padded portion includes a first outer cover. The first outer cover is mounted to the first panel such that a first cavity is formed by at least a portion of the outer cover and at least a portion of the upper surface. The first padded portion also includes first padding located in the first cavity.

An exemplary method for making a padded portion of a center console is provided. A molded panel having an upper surface is provided. An outer cover is secured to the panel such that a cavity is formed by at least a portion of the outer cover and at least a portion of the upper surface. Padding is inserted into the cavity to form a padded portion on the panel.

An exemplary center console includes a first panel and a first padded portion. The first panel has a first upper surface. The first panel is mounted to a vehicle floor adjacent to a driver seat in a vehicle. The first padded portion has a first outer cover and first padding. The first outer cover is mounted to the first panel such that a first cavity is formed by at least a portion of the outer cover and at least a portion of the upper surface. The first padding is located in the first cavity. The first padded portion has a front edge, a rear edge, and a second upper surface mounted to the front edge and the rear edge. Relative to the vehicle floor, the second upper surface is contoured to have a first height at the rear edge and a second height at the front edge. The first height is greater than the second height.

DETAILED DESCRIPTION

Figure 1:
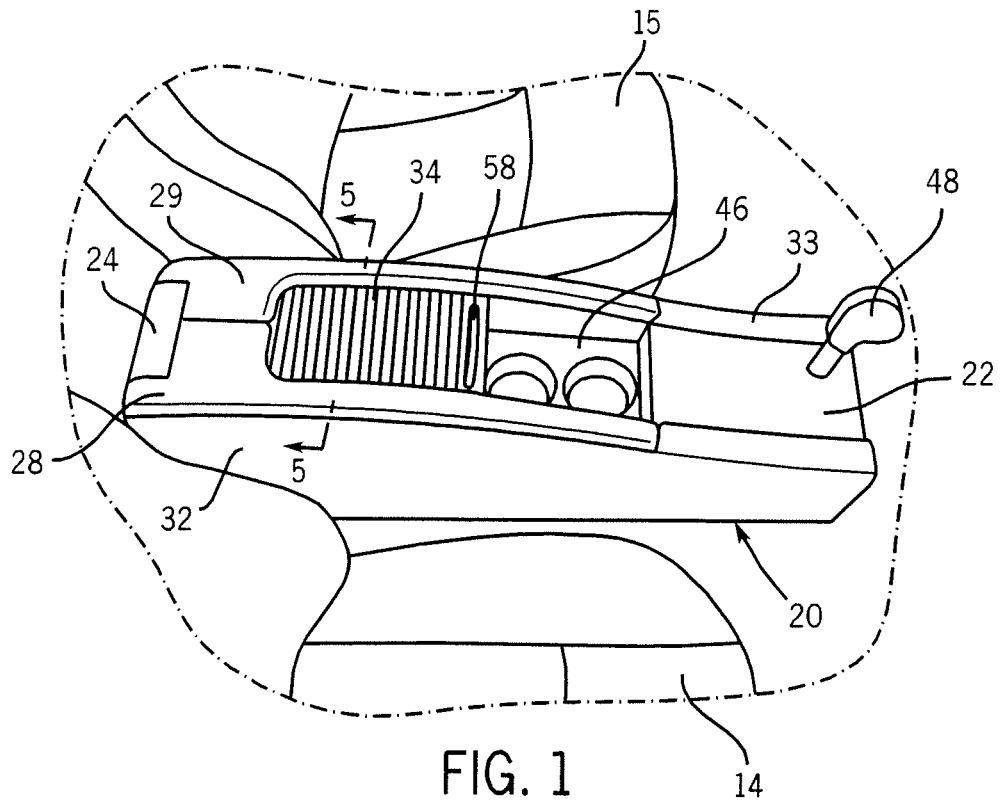
FIG. 1 is an isometric view of a center console with a door in a closed position in accordance with an exemplary embodiment.

FIG. 1 is an isometric view of a center console 20 with a door 34 in a closed position in accordance with an exemplary embodiment. Center console 20 can be mounted in a vehicle between a first seat 14 and a second seat 15. In an exemplary embodiment, the vehicle can be an automobile. Alternatively, center console 20 may be used in any other type of vehicle, including a boat, a ship, a train, an airplane, a military vehicle, farm equipment, etc. Center console 20 can be mounted to the vehicle frame using fasteners or any other mounting method known to those of skill in the art. In addition to door 34, center console 20 can also include a first side panel 32, a second side panel 33, a rear panel 24, and a shifter panel 22. Exemplary individual components of a center console are more clearly illustrated in the exploded view of FIG. 5.

In an exemplary embodiment, first side panel 32 and second side panel 33 can be generally symmetric molded components having a rigid or semi-rigid outer surface. In another exemplary embodiment, first side panel 32 and second side panel 33 can be composed of a thermoplastic resin such as polypropylene, polyethylene, high density polyethylene, acrylonitrile butadiene styrene (ABS), polycarbonate, vinyl, polyester, polyester, polyurethane, thermoplastic elastomer (TPE), thermoplastic elastomer polyolefin (TPO), thermoplastic vulcanite (TPV), polyvinyl chloride (PVC), nylon, etc. Alternatively, first side panel 32 and second side panel 33 may be composed of any other polymers, elastomers, thermoplastics, thermosets, etc., or any other suitable material such as aluminum, magnesium, or metal alloys.

First side panel 32 and second side panel 33 can be mounted to one another or adjacent to one another using snaps, fasteners, adhesive, clamps, or any other mounting method(s). First side panel 32 provides a first side surface (i.e., the side adjacent first seat 14) of center console 20 and second side panel 33 provides a second side surface (i.e., the side adjacent second seat 15) of center console 20. First side panel 32 and second side panel 33 can also form at least a portion of an upper surface (i.e., the top surface of center console 20) and a front side (i.e., the side positioned closest to the front of the vehicle) of center console 20. Rear panel 24 can be mounted to first side panel 32 and second side panel 33 to provide a rear side (i.e., the side positioned closest to the rear of the vehicle) of center console 20. Rear panel 24 may include a vent for rear seat ventilation, a control for the rear seat ventilation, an ashtray, a cigarette lighter, and/or any other accessories for rear seat occupants of the vehicle. In an alternative embodiment, first side panel 32 and second side panel 33 may be molded to form the rear surface of center console 20 such that rear panel 24 is not used. In another alternative embodiment, center console 20 may be formed from a single molded panel.

Shifter panel 22, which is mounted between first side panel 32 and second side panel 33, can accommodate and/or support a shifter 48. A driver of the vehicle in which center console 20 is mounted can use shifter 48 to adjust a transmission of the vehicle. In an alternative embodiment, shifter 48 may be positioned on a dashboard of the vehicle, on a steering wheel of the vehicle, or on the floor of the vehicle in front of center console 20. In such an embodiment, shifter panel 22 may not be included in center console 20. In another alternative embodiment, first side panel 32 and second side panel 33 may be formed to accommodate and/or support shifter 48 such that a separate shifter panel 22 is not used.

Figure 2:
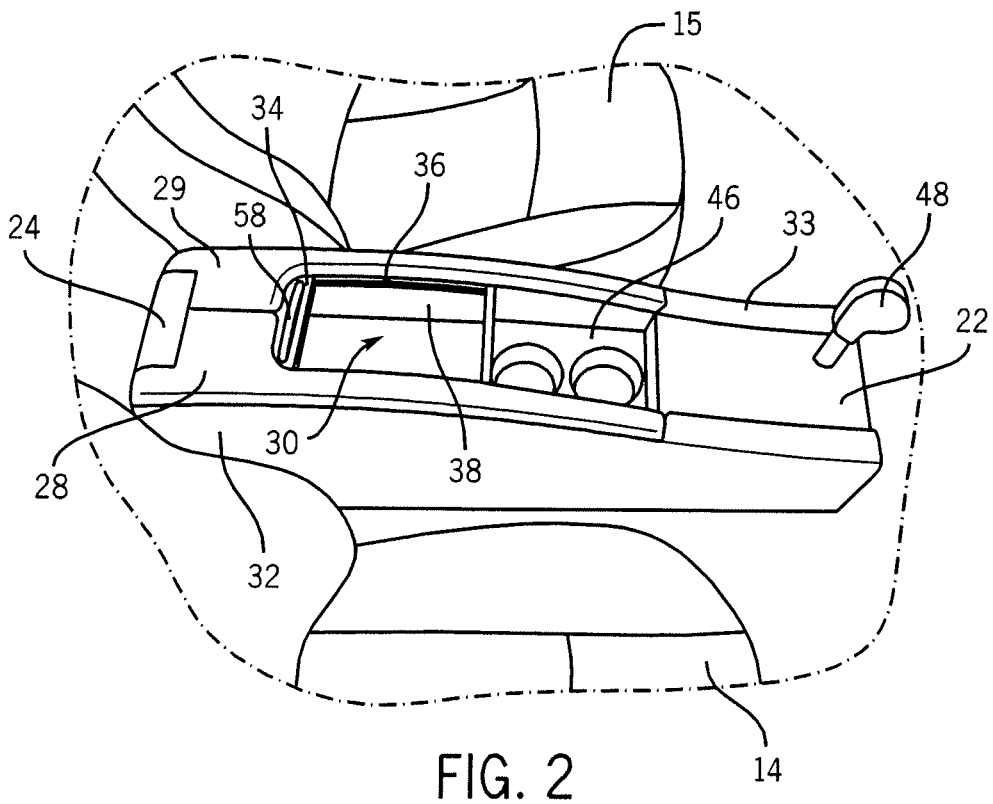
FIG. 2 is an isometric view of the center console of FIG. 1 with the door in an open position in accordance with an exemplary embodiment.

Door 34 can be used to cover a storage compartment 30, which is illustrated with reference to FIG. 2. Storage compartment 30 is defined at least in part by first side panel 32 and second side panel 33. Door 34 includes a handle 58 such that a driver or passenger is able slide door 34 between the closed position illustrated in FIG. 1 and the open position illustrated in FIG. 2. Alternatively, door 34 may include an aperture, other protrusion, depression, or other feature which allows door 34 to be slid. Door 34 is mounted to center console 20 by way of a first track (not visible) mounted to first side panel 32 and a second track 36 mounted to second side panel 33. The first track and second track 36 may be molded as part of first side panel 32 and second side panel 33, respectively. Alternatively, the first track and second track 36 may be separate components which are mounted to first side panel 32 and second side panel 33, respectively. In an exemplary embodiment, the first track and second track 36 can include curved portions such that door 34 can compactly retract within storage compartment 30. Door 34 can be a paneled or segmented door that is configured to follow the first track and second track 36 similar to the way in which a garage door rides on tracks. In an exemplary embodiment, door 34 can be a tambour door. Alternatively, door 34 may be a rigid door and the first track and second track 36 may be straight tracks.

As illustrated with reference to FIGS. 1 and 2, center console 20 also includes a beverage holder 46. In alternative embodiments, center console 20 may include any other accessories such as an electrical outlet, a cigarette lighter, an ashtray, coin slots, a parking break, etc. In an exemplary embodiment, beverage holder 46 is accessible when door 34 is in the closed position of FIG. 1. In an alternative embodiment, the first track and second track 36 may extend over beverage holder 46 such that door 34 can be used to cover beverage holder 46. In another exemplary embodiment, storage compartment 30 may include an insert 38 mounted to first side panel 32, second side panel 33, and/or rear panel 24. In one embodiment, beverage holder 46 and any other accessories included in center console 20 may be part of or mounted to insert 38.

Center console 20 also includes a first padded portion 28 and a second padded portion 29. First padded portion 28 can be used as an armrest by an individual seated in first seat 14, and second padded portion 29 can be used as an armrest by an individual seated in second seat 15. As illustrated in FIGS. 1 and 2, door 34 is mounted at a lower height than the upper surfaces of first padded portion 28 and second padded portion 29. As such, door 34 can be opened and closed without obstructing the armrest function of first padded portion 28 or second padded portion 29. For example, a driver in second seat 15 may have his/her arm located on second padded portion 29, and a passenger in first seat 14 may desire to access storage compartment 30. Without disturbing the driver, the passenger can use handle 58 to open door 34 by sliding door 34 along the first track and second track 36. Because it is mounted at a lower height than the upper surface of second padded portion 29, door 34 is able to slide open without contacting the driver's arm. The passenger can also use handle 58 to close door 34 without contacting the driver's arm. First padded portion 28 and second padded portion 29 are described in more detail with reference to FIG. 3.

Figure 3:
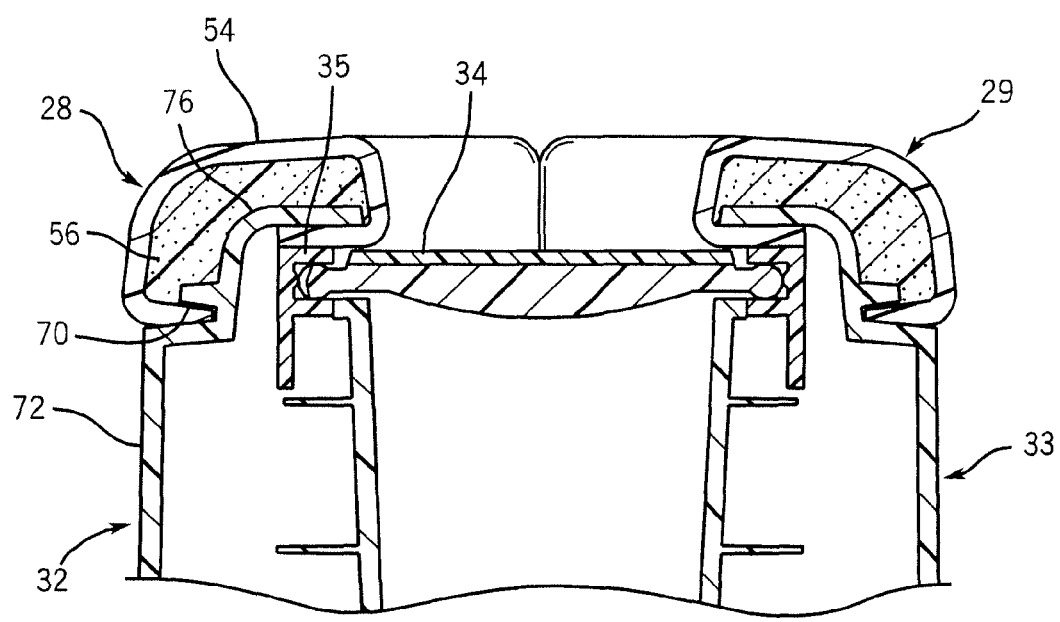
FIG. 3 is a partial cross-sectional view of the center console of FIG. 1 taken along a line 5-5 in accordance with an exemplary embodiment.

FIG. 3 is a partial cross-sectional view of center console 20 taken along a line 5-5 (see FIG. 1) in accordance with an exemplary embodiment. As discussed above, first side panel 32 and second side panel 33 can include a rigid outer surface. In an exemplary embodiment, the rigid outer surface can act as a substrate for forming first padded portion 28 and second padded portion 29. As such, first padded portion 28 and second padded portion 29 are formed without a separate substrate, resulting in a low bulk, cost efficient design. Described below is an exemplary process for forming a padded portion on a substrate. The process is described in general and with reference to first padded portion 28. It is to be understood that the same process can also be used to form second padded portion 29.

First padded portion 28 can include an outer cover (or skin) 54. In an exemplary embodiment, outer cover 54 can be composed of a relatively soft or flexible polymeric material such as polyurethane, polyvinylchloride (PVC), thermoplastic olefin (TPO), etc. Alternatively, outer cover 54 may be composed of any combination of polymeric materials, cloth, leather, composite materials and/or any other materials which are able to provide comfort when in physical contact with an individual. In one embodiment, outer cover 54 can have a thickness ranging from approximately 0.5 millimeters to approximately 3.0 millimeters. Alternatively, outer cover 54 may have a thickness ranging from approximately 1.0 millimeters to approximately 1.5 millimeters. Alternatively, any other thickness may be used. Outer cover 54 can be produced using a slush molding process, a vacuum forming process, an injection molding process, an extrusion process, a casting process (e.g., gravity casting), or any other suitable process known to those of skill in the art.

First padded portion 28 also includes padding (or filler material) 56. In an exemplary embodiment, outer cover 54 can be mounted directly to first side panel 32 such that a cavity is formed. Padding 56 can be inserted into the cavity between outer cover 54 and first side panel 32. As such, there is no need for first padded portion 28 to be formed on an additional substrate which is in turn mounted to first side panel 32. Elimination of the additional substrate reduces the weight and cost of first padded portion 28, simplifies the manufacturing process, and provides a more aesthetically appealing first padded portion 28. In an exemplary embodiment, padding 56 can be a foam or foam-like polymeric material such as urethane foam. Alternatively, any other soft or semi-soft material may be used. In another exemplary embodiment, padding 56 can be disposed into the cavity between outer cover 54 and first side panel 32 in a liquid form. The liquid form can solidify and/or expand to fill the cavity. The amount of padding 56 disposed into the cavity can also be used to control the softness, structure, and/or shape of first padded portion 28. In one embodiment, padding 56 may be configured to bond with outer cover 54 and/or first side panel 32. The bond can be through a chemical reaction between padding 56 and outer cover 54 and/or first side panel 32. Alternatively, the bond can be through an adhesive applied to padding 56, outer cover 54, and/or first side panel 32.

As illustrated with reference to FIG. 3, first side panel 32 includes a mounting slot 70 configured to receive an edge of outer cover 54. Mounting slot 70 can be a tapered slot, groove, or channel which secures outer cover 54 through a friction or interference fit. Outer cover 54 can also be frictionally secured between an interior surface of first side panel 32 and an upper surface of a first track 35 to which door 34 is mounted. In alternative embodiments, one or more fasteners such as screws, bolts, rivets, etc. may be used alone or in addition to an interference fit to secure outer cover 54 to first side panel 32. Alternatively, adhesives, clamps, or any other mounting methods may be used. In another alternative embodiment, first side panel 32 may include one or more apertures configured to receive portions of outer cover 54 such that outer cover 54 is secured. Outer cover 54 can be forced into the one or more apertures through external pressure. Alternatively, outer cover 54 can be drawn into the one or more apertures using a vacuum. In another alternative embodiment, outer cover 54 may extend down and cover a lower portion 72 of first side panel 32 such that a larger visible portion of first side panel 32 is covered. In such an embodiment, outer cover 54 can be mounted adjacent (i.e., without a cavity between first side panel 32 and outer cover 54) to lower portion 72 of first side panel 32 using adhesive, fasteners, or any other mounting method. In another exemplary embodiment, outer cover 54 can be mounted to first side panel 32 in a manner that provides a substantially airtight and/or watertight seal from the ambient environment.

As mounted, outer cover 54 and an upper surface 76 of first side panel 32 form a cavity in which padding 56 is placed. As illustrated in FIG. 3, outer cover 54 is mounted to first side panel 32 at two locations such that a single cavity for receiving padding 56 is formed. In alternative embodiments, outer cover 54 may be mounted to first side panel 56 in three or more locations such that a plurality of cavities for receiving padding 56 are formed. As such, a single outer cover can be used to form a plurality of distinct padded portions. Because a single outer cover is used, the plurality of padded portions have tight, consistent, and aesthetically pleasing seams. Traditional padded portions, which included a separate substrate mounted to a vehicular panel, are not able to achieve such a tight, consistent, and aesthetically pleasing appearance.

A plurality of padded portions may be formed on the substrate by mounting the outer cover to the substrate such that a plurality of cavities are formed. The substrate can include a plurality of vacuum apertures configured to receive and/or hold portions of the outer cover such that the plurality of substantially airtight cavities are formed between the substrate and the outer cover. The outer cover can be placed over at least a portion of the substrate, and a vacuum box can be used to draw the outer cover into or adjacent to the plurality of vacuum apertures in the substrate such that the outer cover is secured to the substrate and the plurality of cavities are formed. Alternatively, the outer cover may be secured or mounted to the substrate using fasteners, adhesives, or any other methods. The padding can be injected, poured, or otherwise inserted into the plurality of cavities through one or more padding apertures in the substrate. The padding apertures can be positioned at any location on the substrate which provides access to the plurality of cavities. Because the outer cover is secured to the substrate in a substantially watertight and airtight manner, the padding is not drawn into the vacuum through the vacuum apertures.

In an exemplary embodiment, a composite/aluminum tool as known to those of skill in the art can be used to implement insertion of the padding into the one or more cavities. Alternatively, any other fill tube, insertion device, nozzle, etc. can be used. The substrate may also include one or more vent holes adjacent to the one or more cavities to reduce the amount of carbon dioxide or other gas which may accumulate in the one or more cavities during the filling operation. Once the padding is inserted into the one or more cavities, any vacuum pressure used to secure the outer cover to the substrate can be removed, and the outer cover can be mounted to the substrate using adhesives, one or more fasteners, and/or a bond formed between the outer cover and the padding. Alternatively, the outer cover may be mounted to the substrate prior to applying the vacuum. In another alternative embodiment, a vacuum may not be used. In one embodiment, the padded portion may be formed using a foam-in-place (FIP) process while the substrate is in a mold used to form the substrate. Alternatively, the padded portion may be formed after the substrate is removed from the mold. In an alternative embodiment, a self-skinning foam can be used to form the padded portion. Self-skinning foam can refer to any foam which forms its own skin (or outer cover) upon application, as known to those of skill in the art. The self-skinning foam can be applied to the substrate while the substrate is in a mold. In such an embodiment, an outer cover is not mounted to the substrate prior to insertion of the self-skinning foam.

Figure 4:
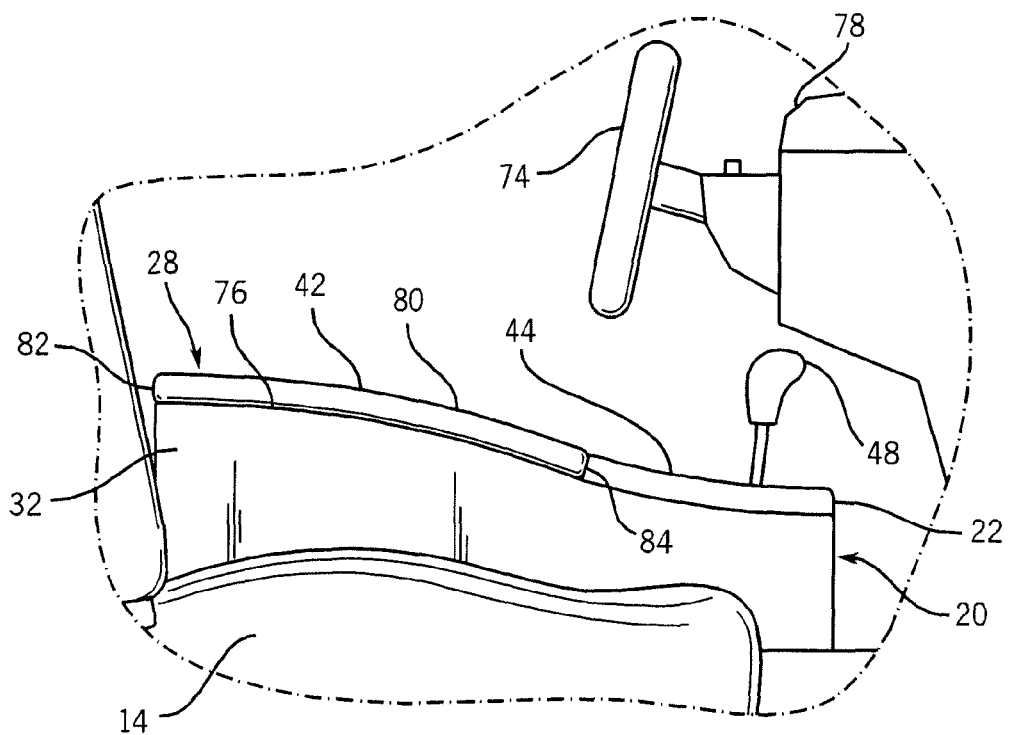
FIG. 4 is a side elevation view of the center console of FIG. 1 in accordance with an exemplary embodiment.

FIG. 4 is a side elevation view of center console 20 in accordance with an exemplary embodiment. As illustrated in FIG. 4, the visible upper surface of center console 20 is formed in part by an upper surface 80 of first padded portion 28. Upper surface 80 is positioned between a rear edge 82 of first padded portion 28 and a front edge 84 of first padded portion 28. First padded portion 28 is mounted to upper surface 76 of first side panel 32. Upper surface 80 of first padded portion 28 forms a compound curve having a convex portion 42 and a concave portion 44. Concave portion 44 is also formed in part by an upper surface of shifter panel 22. As such, upper surface 80 is more highly elevated (with respect to a frame or floor of the vehicle) at rear edge 82 of first padded portion 28 than at front edge 84 of first padded portion 28. The higher elevation at rear edge 82 provides taller individuals with a higher armrest. Similarly, the lower elevation at front edge 84 provides shorter individuals with a lower armrest. For example, a tall individual sitting in the driver seat or passenger seat of a vehicle is likely to have his/her seat adjusted toward the rear of the vehicle (i.e., away from a steering wheel 74) such that he/she has room for his/her legs. When the driver seat or passenger seat is adjusted toward the rear of the vehicle, the tall individual is positioned such that he/she is able to use the highest part of first padded portion 28 (or second padded portion 29) as an armrest. As the seat is moved forward (i.e., toward steering wheel 74) to accommodate shorter individuals, the seated individuals are positioned adjacent to correspondingly lower portions of first padded portion 28 or second padded portion 29. As such, center console 20 is able to accommodate individuals of a plurality of different sizes without utilizing a bulky, complex adjustment assembly to raise or lower center console 20.

Figure 5:
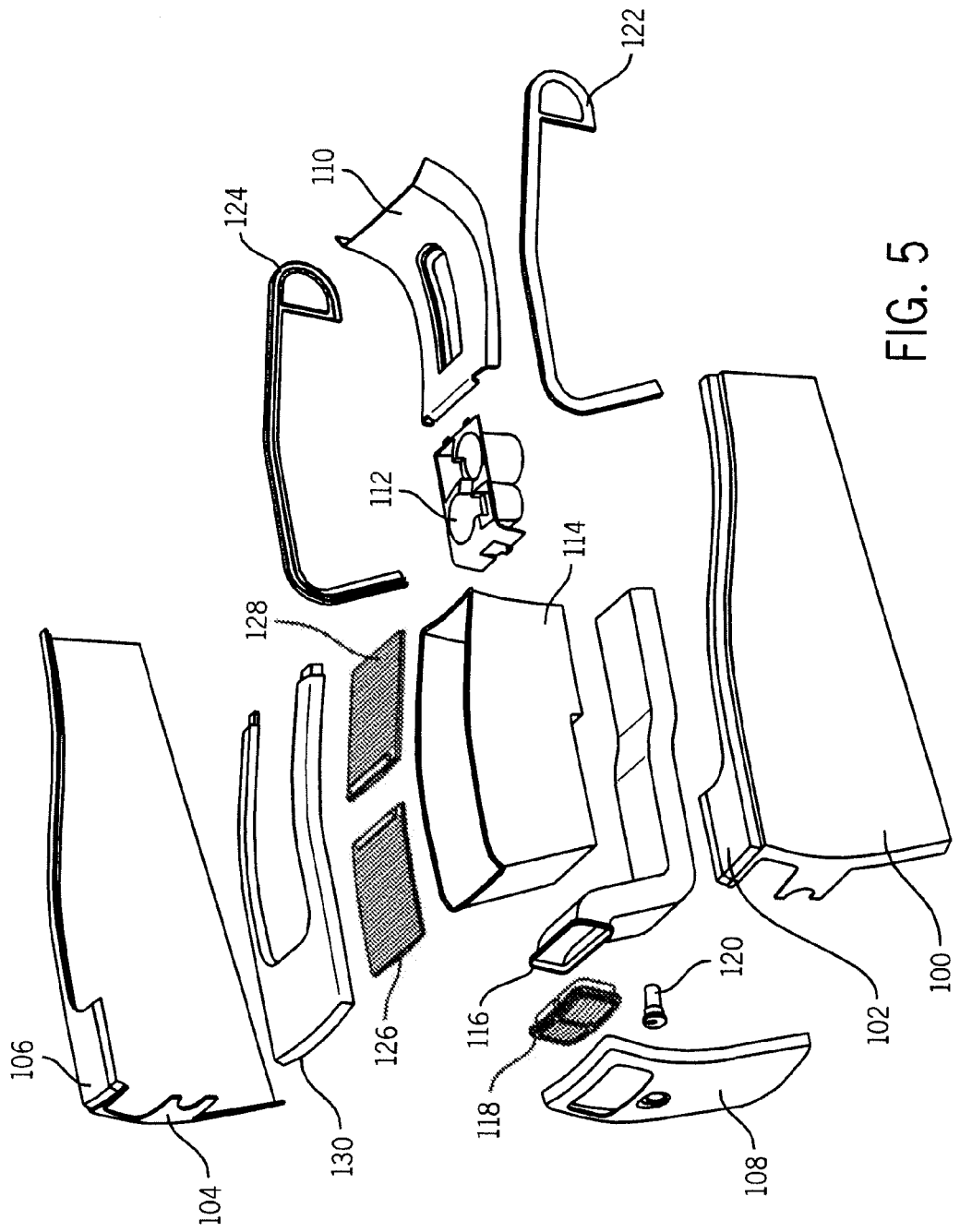
FIG. 5 is an exploded view illustrating a center console in accordance with an exemplary embodiment.

FIG. 5 is an exploded view of a center console in accordance with an exemplary embodiment. Included in the exploded view are a first side panel 100 having a first upper surface 102, a second side panel 104 having a second upper surface 106, a rear panel 108, a shifter panel 110, a beverage holder 112, and an insert 114. The exploded view also illustrates a ventilation duct 116, a ventilation cover 118, and a ventilation control 120. Ventilation cover 118 and ventilation control 120 are accessible through apertures in rear panel 108 such that rear seat passengers can control ventilation. The exploded view further illustrates a first track 122, a second track 124, a first door segment 126, and a second door segment 128. In an exemplary embodiment, first door segment 126 and second door segment 128 be mounted in first track 122 and second track 124, and can operate independently of one another. Also illustrated in the exploded view of FIG. 5 is a one-piece outer cover 130 which is configured to cover first upper surface 102 and second upper surface 106. In an exemplary embodiment, first side panel 100 can be mounted to second side panel 104, and outer cover 130 can be mounted to first side panel 100 and second side panel 104 such that a single cavity is formed. Foam can be inserted into the cavity such that a single padded portion is formed.

For purposes of this disclosure, the term "mount" and variations thereof can refer to the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature such as components which are molded to one another, or alternatively may be removable or releasable in nature. As used in this disclosure, the term "mount" can include join, unite, connect, associate, insert, hang, hold, affix, attach, fasten, bind, paste, secure, bolt, nail, glue, screw, rivet, solder, weld, and other like terms.

The embodiments described herein have been described with reference to vehicle components. It is important to understand that the components and methods shown herein are not limited to vehicular applications. The components and methods described herein may also be used in non-vehicle applications such as chairs, desks, benches, and other furniture items.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A center console comprising:
    a first side panel formed of a relatively rigid material, the first side panel having a first outer surface that at least partially defines a visible portion of the center console; and
    a first padded portion comprising
        a first outer cover, wherein the first outer cover is mounted to the first side panel such that a first cavity is formed by at least a portion of the outer cover and at least a portion of the outer surface of the side panel; and
        first padding located in the first cavity.

2. The center console of claim 1, wherein the first side panel further comprises a mounting slot, wherein the first outer cover is mounted to the first side panel by way of an interference fit between the first outer cover and the mounting slot.

3. The center console of claim 1, further comprising:
    a second side panel formed of a relatively rigid material, the second panel having a second outer surface that at least partially defines a visible portion of the center console; and
    a second padded portion comprising
        a second outer cover mounted to the second side panel such that a second cavity is formed between the second outer cover and at least a portion of the second outer surface of the second side panel; and
        second padding located in the second cavity.

4. The center console of claim 3, wherein the first padded portion is configured to be a first armrest adjacent to a passenger seat, and the second padded portion is configured to be a second armrest adjacent to a driver seat.

5. The center console of claim 3, wherein the first side panel has a first upper portion and a first lower portion, wherein the second side panel has a second upper portion and a second lower portion, wherein the second side is mounted to the first side panel such that the first upper portion and the second upper portion define at least a portion of a storage compartment.

6. The center console of claim 3, wherein the first side panel is configured to be positioned adjacent to a passenger seat in the vehicle, and wherein the second side panel is configured to be positioned adjacent to a driver seat in the vehicle.

7. The center console of claim 3, wherein the first outer cover and the second outer cover are integrally formed as a one-piece outer cover.

8. The center console of claim 5, wherein the first upper portion of the first side panel cooperates with the first outer cover to define the first cavity, and wherein the second upper portion of the second side panel cooperates with the second outer cover to define the second cavity.

9. The center console of claim 5, wherein at least a portion of the first lower portion of the first side panel and the second lower portion of the second side panel defines the visible portion of the center console, and wherein the first lower portion is integrally formed with the first upper portion as a one-piece panel and the second lower portion is integrally formed with the second upper portion as a one-piece panel.

10. The center console of claim 5, further comprising:
a first track mounted to the first side panel;
a second track mounted to the second side panel; and
a door mounted to the first track and the second track and configured to slide along the first track and the second track, wherein the door is configured to slide between at least an open position such that the storage compartment is accessible and a closed position.

11. The center console of claim 10, wherein the door is mounted such that the door can be selectively opened without obstructing the armrest function of the first padded portion and the second padded portion.

12. The center console of claim 10, wherein the door comprises a tambour door.

13. The center console of claim 1, wherein the first padded portion comprises a rear, a front, and an upper surface, and further wherein at least a portion of the upper surface of the first padded portion has a convex shape such that, relative to a vehicle floor, the rear of the first padded portion is positioned higher than the front of the first padded portion.

14. A method for making a padded portion of a center console, the method comprising:
providing a relatively rigid molded panel having an outer surface that at least partially defines a visible portion of the center console;
securing an outer cover to the molded panel such that a cavity is formed between an inner surface of the outer cover and at least a portion of the outer surface of the molded panel; and
inserting padding into the cavity to form a padded portion on the molded panel.

15. The method of claim 14, wherein the outer cover is secured to the molded panel with a vacuum by way of a vacuum aperture in the molded panel.

16. The method of claim 14, wherein the padding is inserted into the cavity through a padding aperture in the molded panel.

17. The method of claim 14, further comprising:
molding the molded panel in a mold; and
mounting the outer cover to the panel using at least one of a fastener or an adhesive.

18. The method of claim 14, wherein the padding bonds to the molded panel and the outer cover.

19. The method of claim 14, wherein the padding is inserted into the cavity using a foam-in-place process.

20. The method of claim 14, further comprising:
securing the outer cover to the molded panel such that a second cavity is formed between a second portion of the outer cover and at least a second portion of the outer surface of the molded panel; and
inserting second padding into the second cavity to form a second padded portion on the molded panel.

21. The method of claim 14, wherein the padded portion comprises a rear, a front, and an upper surface, and further wherein at least a portion of the upper surface of the padded portion has a convex shape such that the rear of the padded portion is positioned higher than the front of the padded portion when the molded panel is mounted in a vehicle.

22. A center console comprising:
a side panel formed of a relatively rigid material, the side panel having a first outer surface and a second outer surface that at least partially defines a first visible portion of the center console; and
a padded portion comprising
a skin having an edge secured to the side panel, the skin having an outer surface that at least partially defines a second visible portion of the center console; and
a padding provided between the skin and the first outer surface of the side panel.

23. The center console of claim 22, wherein the skin and padding are integrally formed.

24. A center console comprising:
a side panel having an outer surface that at least partially defines a first visible portion of the center console;
an inner panel; and
a padded portion having a skin provided around a padding, the skin having an outer surface that at least partially defines a second visible portion of the center console;
wherein the padded portion is secured to the inner panel.

25. The center console of claim 24, wherein the skin and padding are integrally formed.

26. The center console of claim 24, wherein the inner panel includes an upper surface, wherein the padded portion is supported by and secured to the upper surface.

* * * * *